A. HENDERSON.
MACHINE FOR MAKING BLOCK PAPER BAGS.
APPLICATION FILED FEB. 16, 1905.
952,075.
Patented Mar. 15, 1910.
15 SHEETS—SHEET 1.
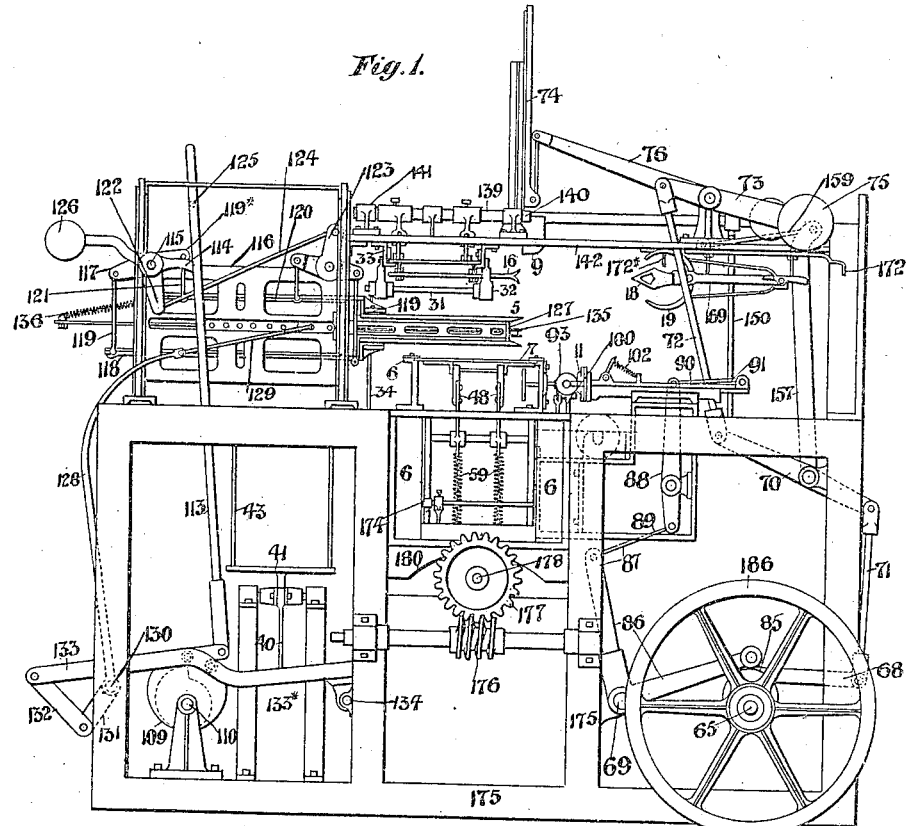

A. HENDERSON.
MACHINE FOR MAKING BLOCK PAPER BAGS.
APPLICATION FILED FEB. 16, 1905.
952,075.
Patented Mar. 15, 1910.
15 SHEETS—SHEET 2.
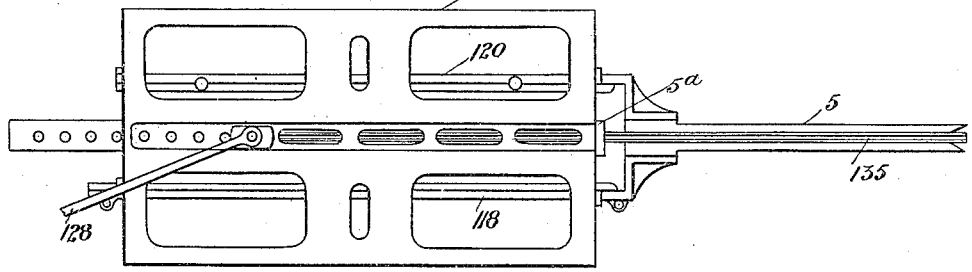
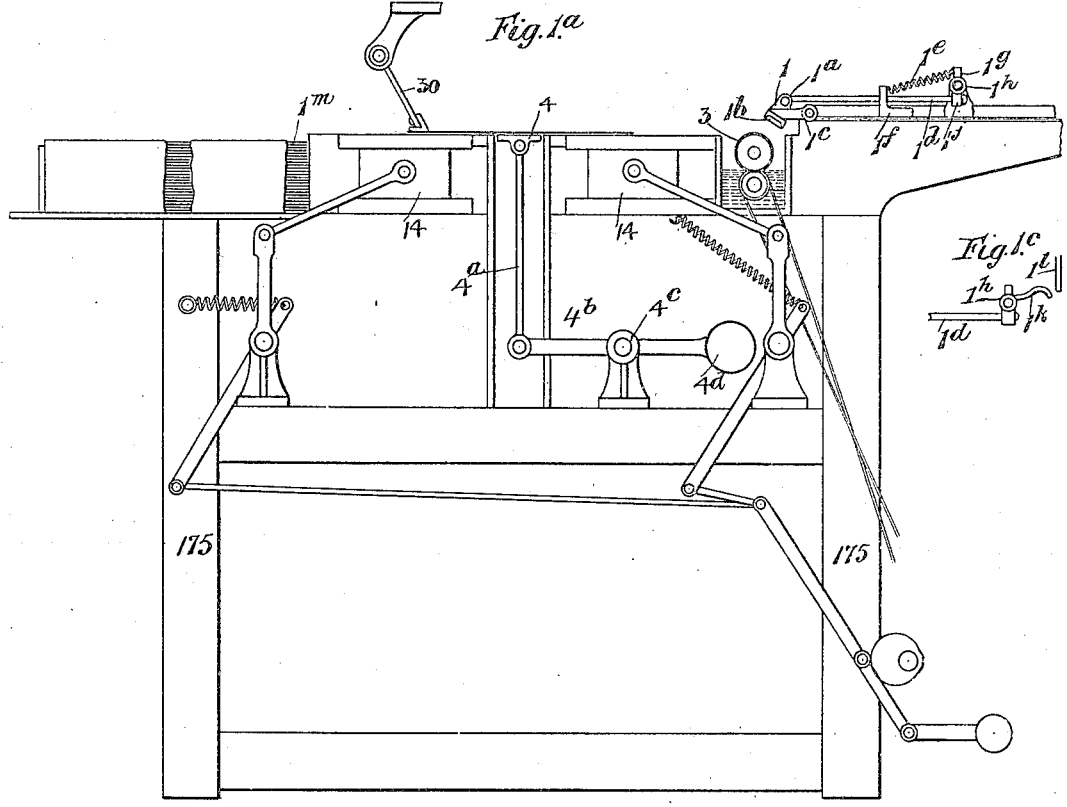
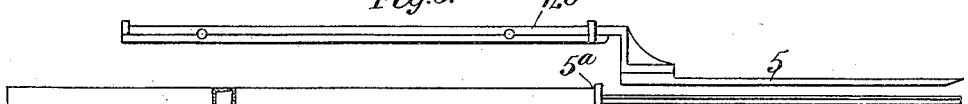
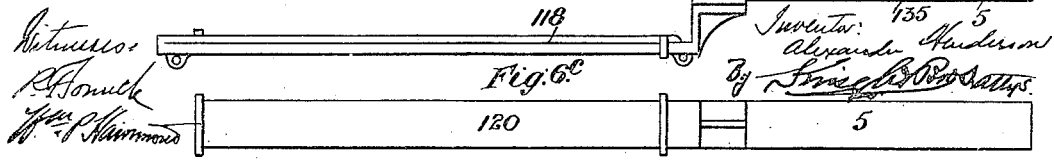

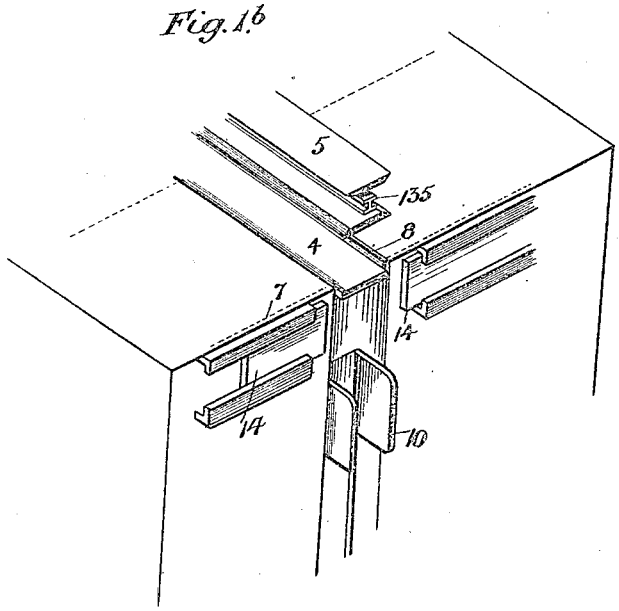

A. HENDERSON.
MACHINE FOR MAKING BLOCK PAPER BAGS.
APPLICATION FILED FEB. 16, 1905.

952,075.

Patented Mar. 15, 1910.
15 SHEETS—SHEET 5.

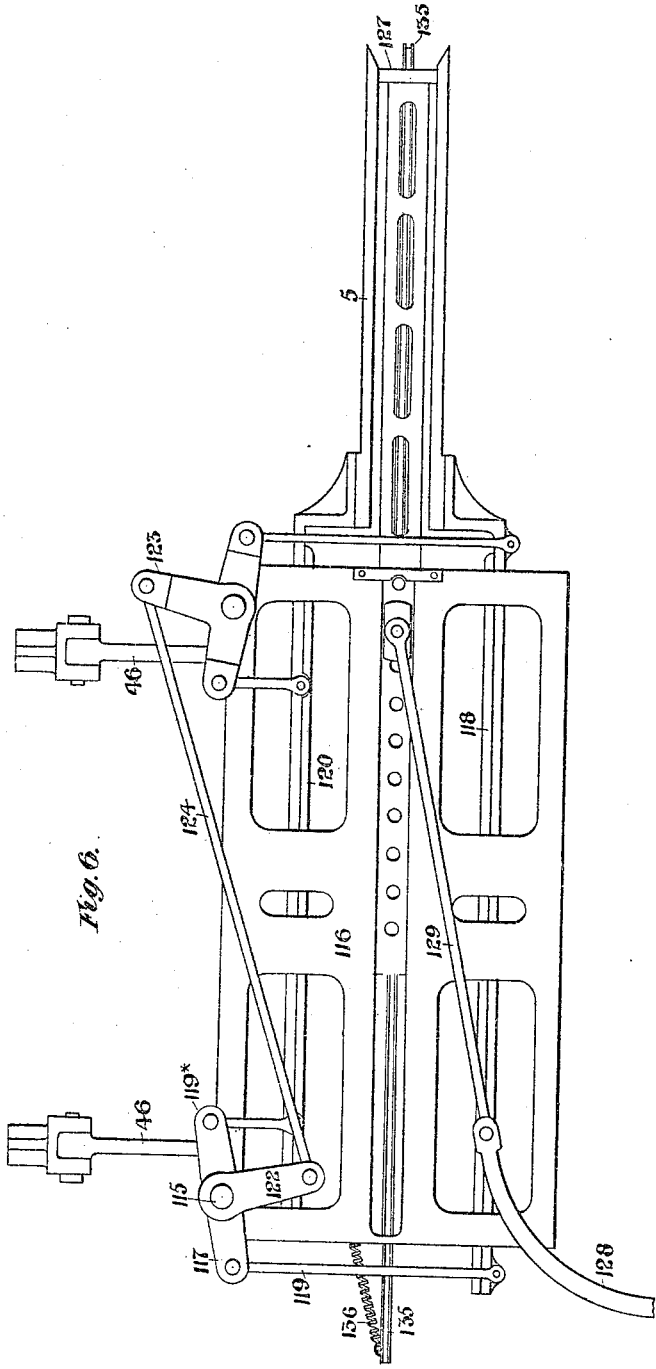

A. HENDERSON.
MACHINE FOR MAKING BLOCK PAPER BAGS.
APPLICATION FILED FEB. 16, 1905.
952,075.
Patented Mar. 15, 1910.
15 SHEETS—SHEET 7.
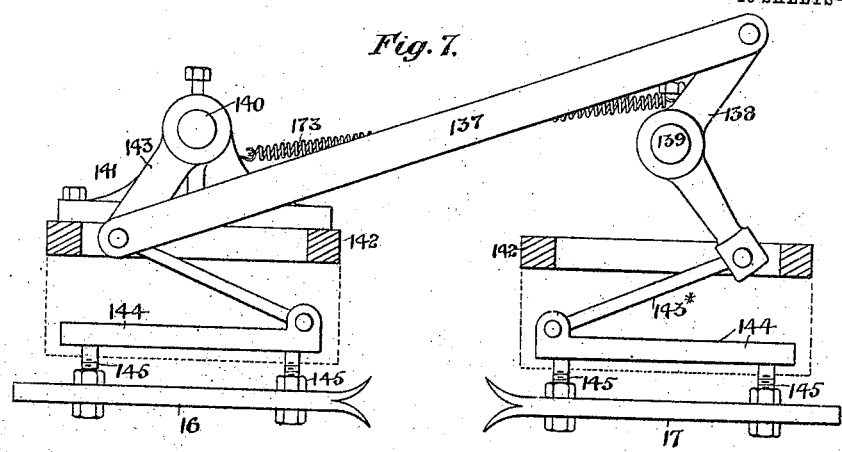
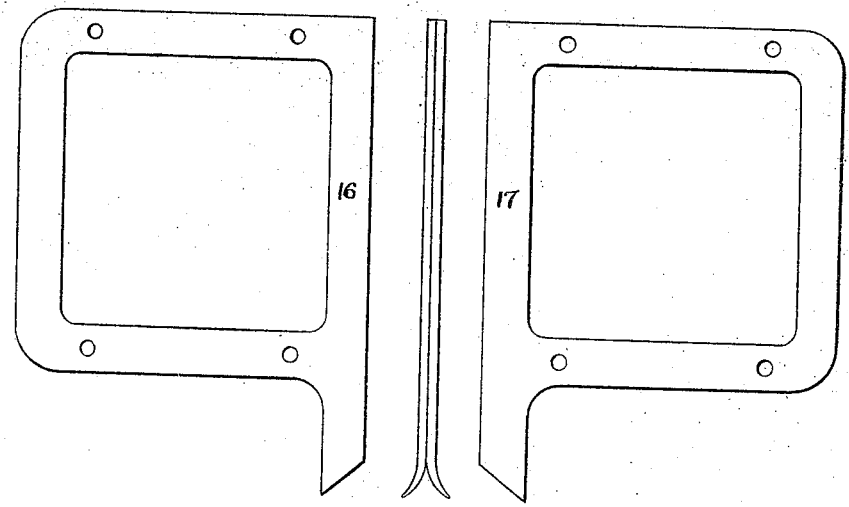
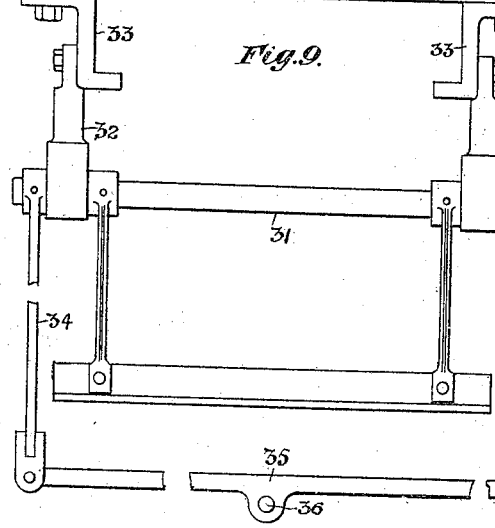
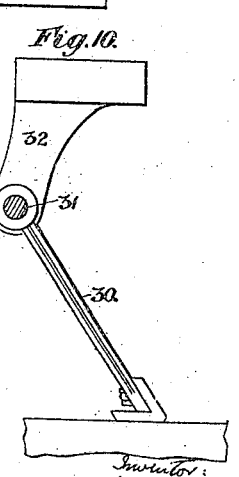

A. HENDERSON.
MACHINE FOR MAKING BLOCK PAPER BAGS.
APPLICATION FILED FEB. 16, 1905.

952,075.

Patented Mar. 15, 1910.
15 SHEETS—SHEET 8.

Witnesses:
Ethel C. Smith
Elias Goldberg

Inventor:
Alexander Henderson
By Knight & Bro.
Attorneys

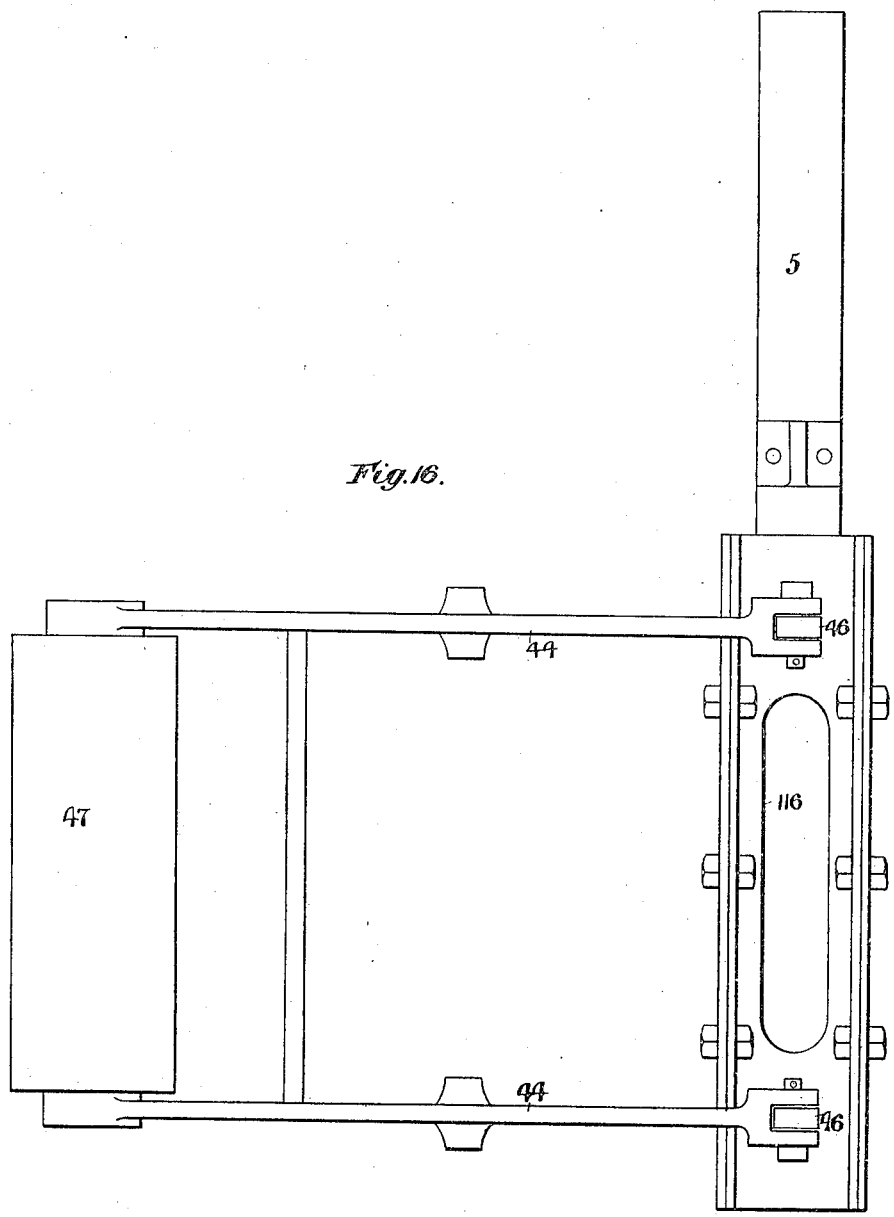

A. HENDERSON.
MACHINE FOR MAKING BLOCK PAPER BAGS.
APPLICATION FILED FEB. 16, 1905.
952,075.
Patented Mar. 15, 1910.
15 SHEETS—SHEET 10.
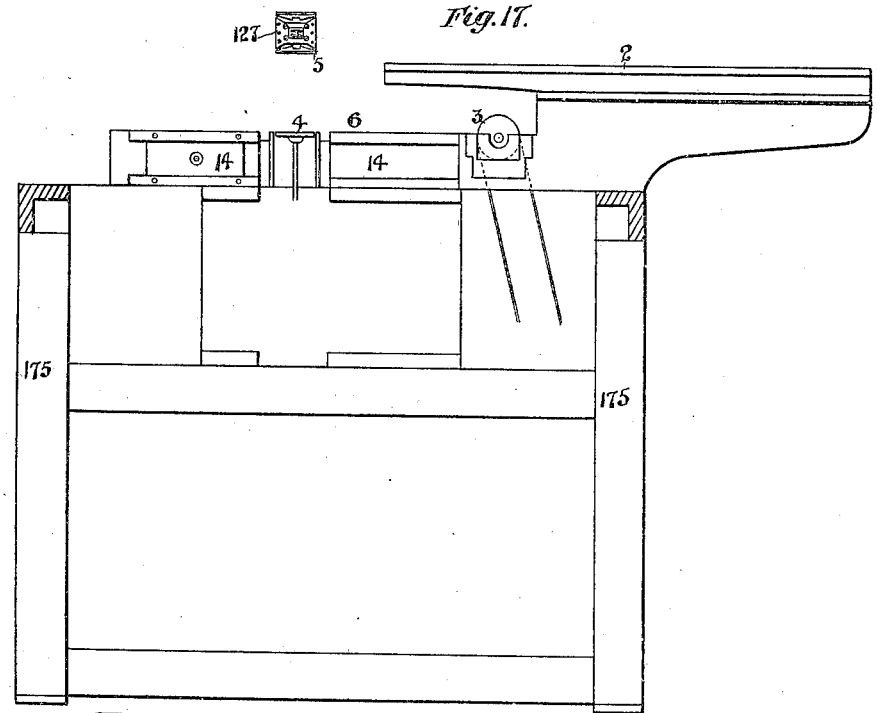
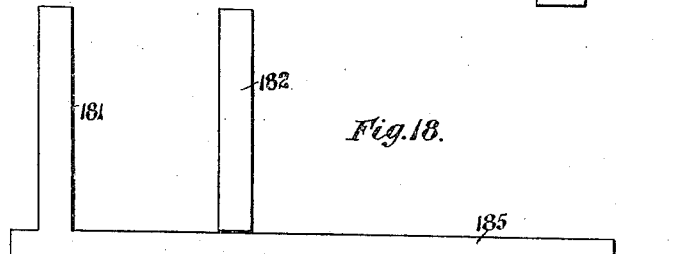
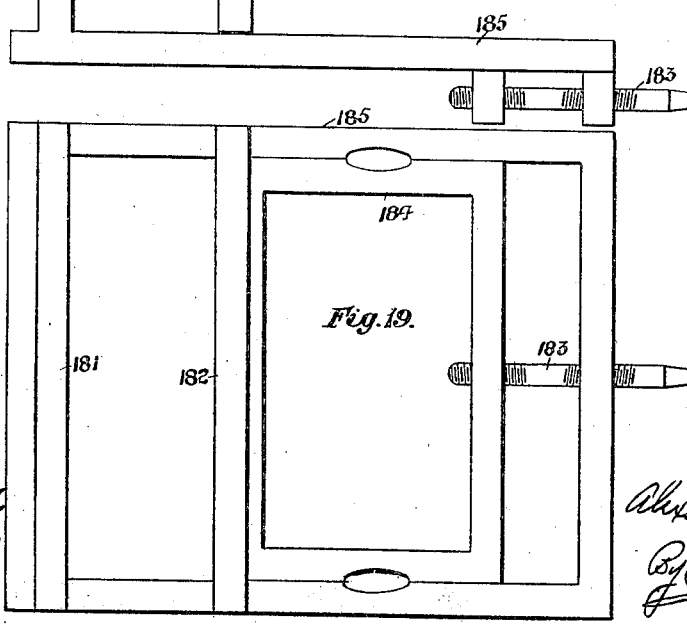

A. HENDERSON.
MACHINE FOR MAKING BLOCK PAPER BAGS.
APPLICATION FILED FEB. 16, 1905.

952,075.

Patented Mar. 15, 1910.
15 SHEETS—SHEET 11.

A. HENDERSON.
MACHINE FOR MAKING BLOCK PAPER BAGS.
APPLICATION FILED FEB. 16, 1905.
952,075.
Patented Mar. 15, 1910.
15 SHEETS—SHEET 12.
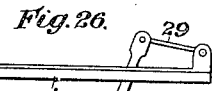
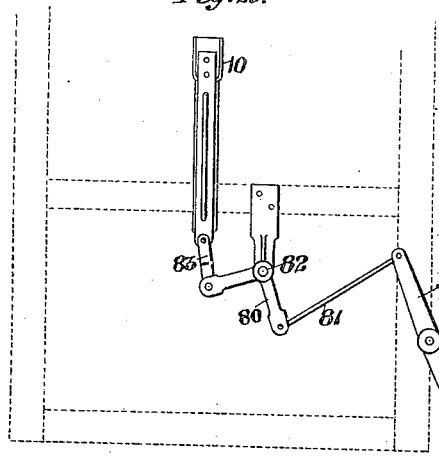
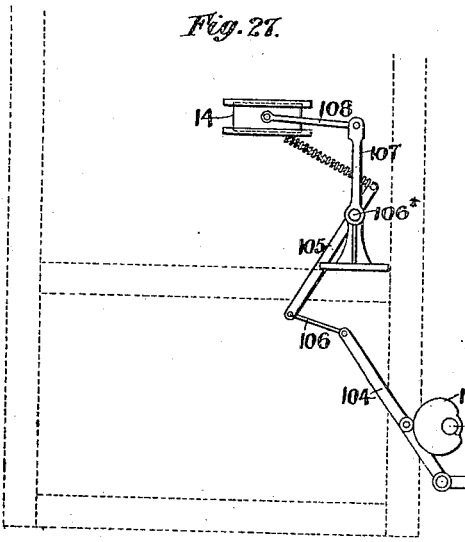
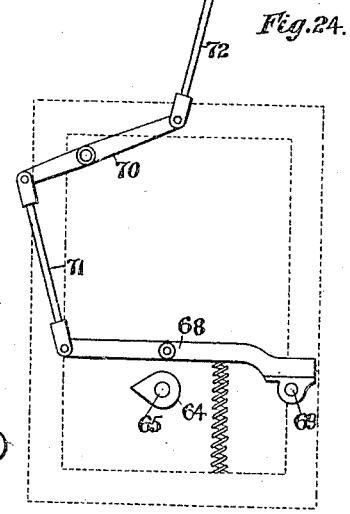

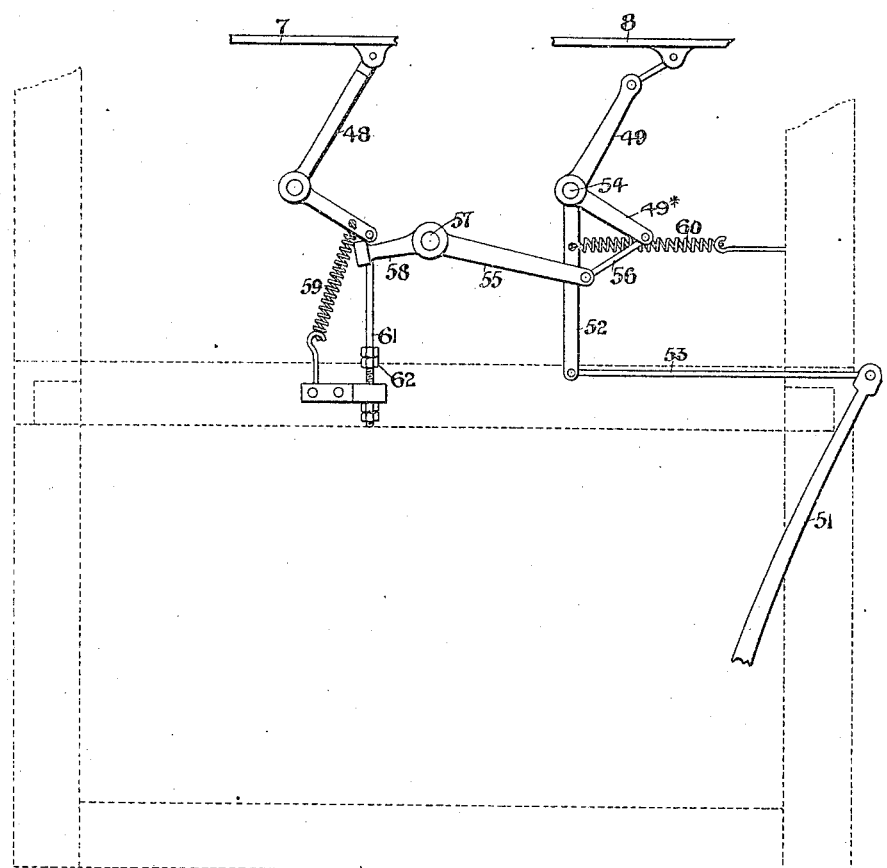

A. HENDERSON.
MACHINE FOR MAKING BLOCK PAPER BAGS.
APPLICATION FILED FEB. 16, 1905.

952,075.

Patented Mar. 15, 1910.
15 SHEETS—SHEET 14.

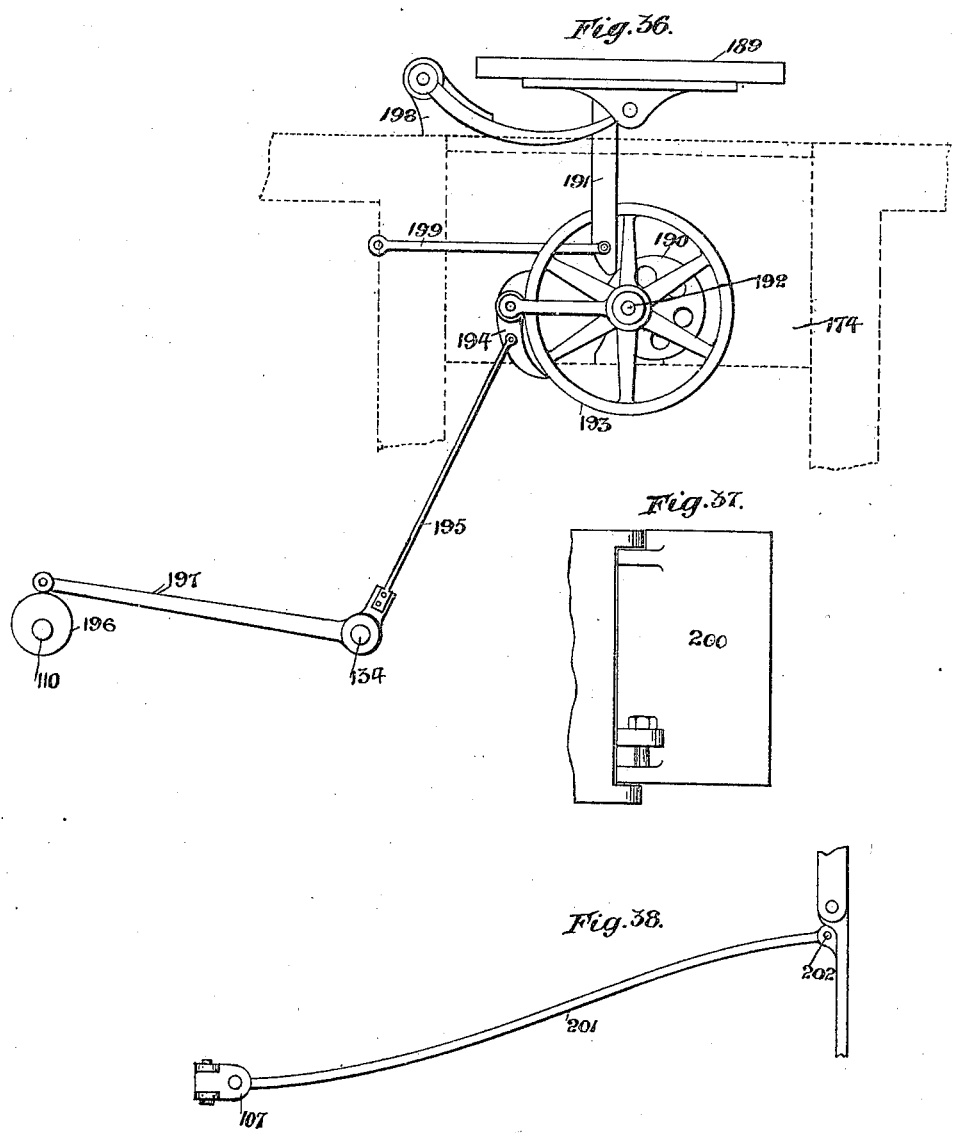

UNITED STATES PATENT OFFICE.

ALEXANDER HENDERSON, OF EDINBURGH, SCOTLAND.

MACHINE FOR MAKING BLOCK PAPER BAGS.

952,075.  Specification of Letters Patent.  Patented Mar. 15, 1910.

Application filed February 16, 1905. Serial No. 245,931.

*To all whom it may concern:*

Be it known that I, ALEXANDER HENDERSON, a subject of the King of the United Kingdom of Great Britain and Ireland, and resident of 172 Easter road, Edinburgh, in the county of Midlothian, Scotland, have invented new and useful Improvements in Machines for Making Block Paper Bags, of which the following is a specification.

This invention relates to a machine for making block paper bags and has for its object the construction of a machine which will form a block paper bag complete and ready for use from a flat sheet of material.

In carrying my invention into effect a pile of sheets of bag paper is cut to the required size and placed on a side table of my improved machine. By means of certain novel mechanisms employed the top sheet is drawn off, folded into bag form, pasted, flattened and delivered automatically ready for use as will be hereinafter explained.

I will now describe my invention with reference to the accompanying drawings and then point out the novel features more particularly in the annexed claims.

Figure 3:
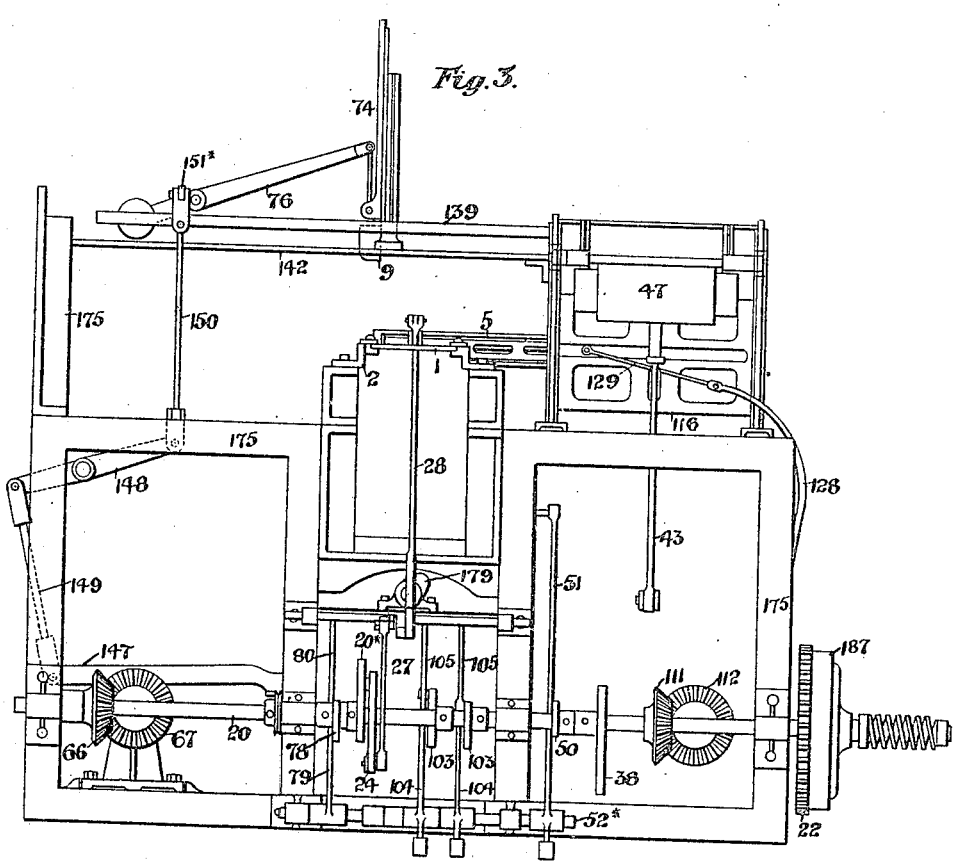
Figure 4:
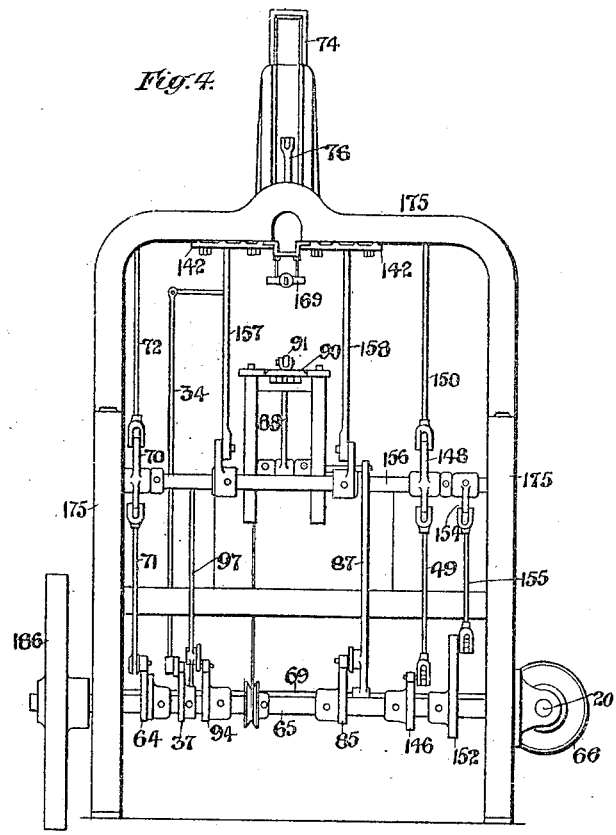
Figure 5:
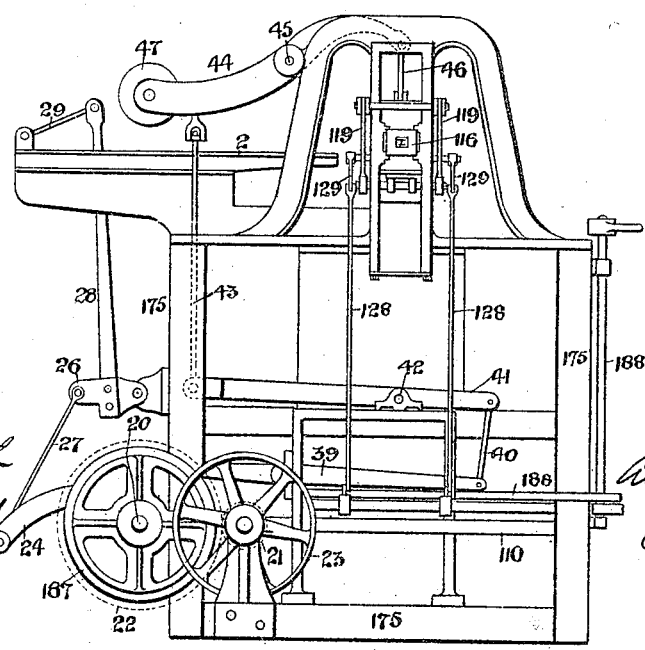
Figure 11:
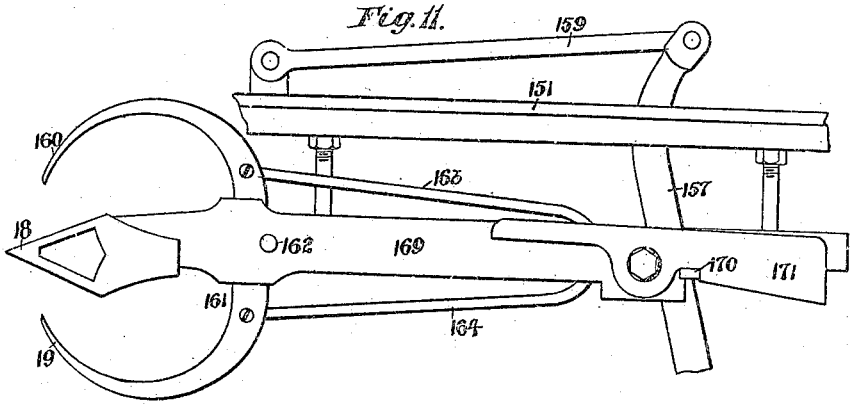
Figure 12:
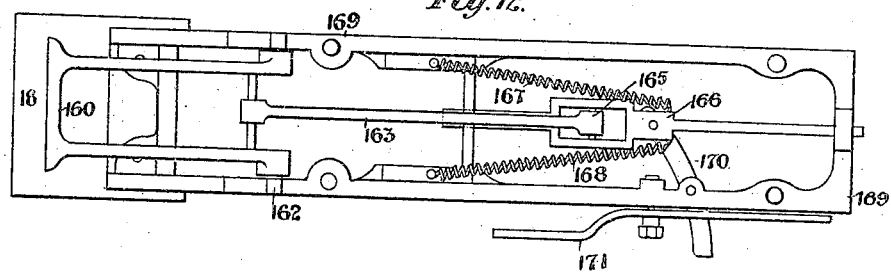
Figure 13:
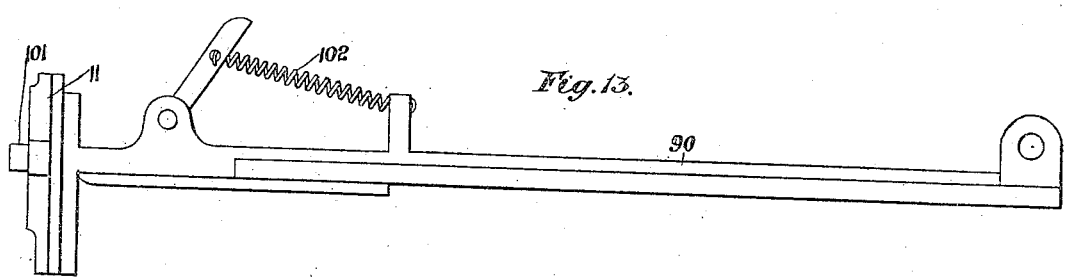
Figure 14:
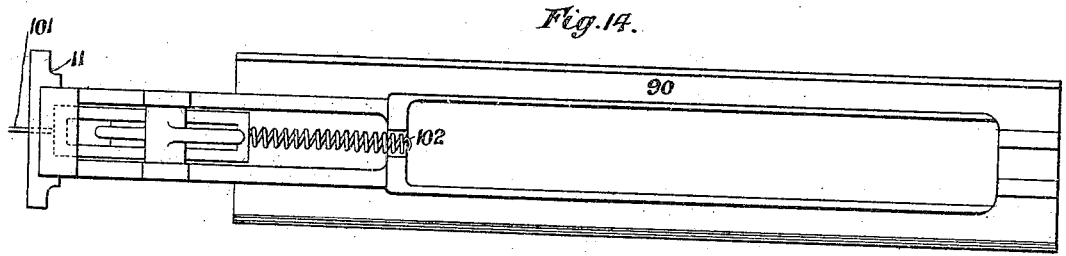
Figure 15:
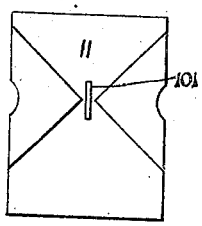
Figure 20:
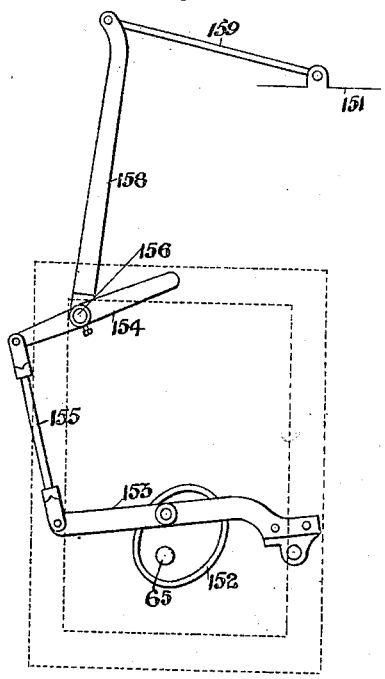
Figure 21:
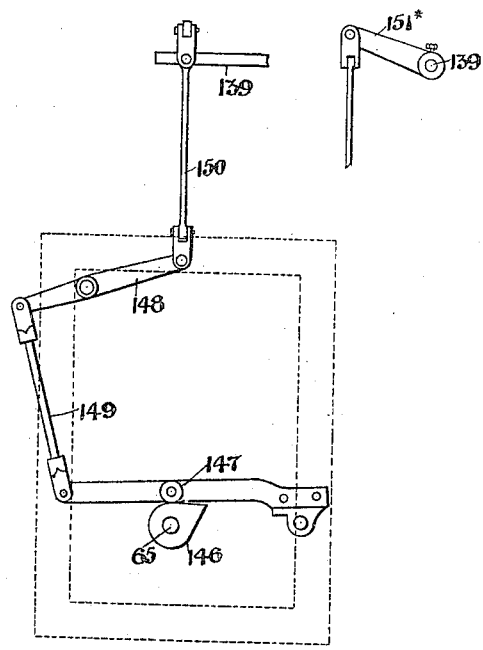
Figure 22:
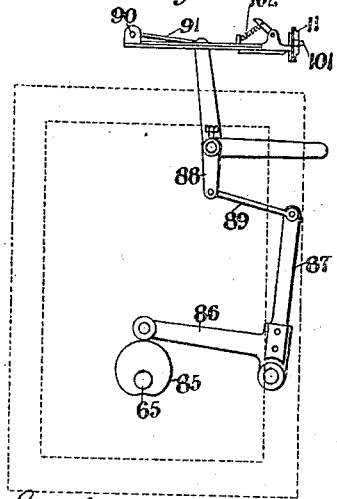
Figure 23:
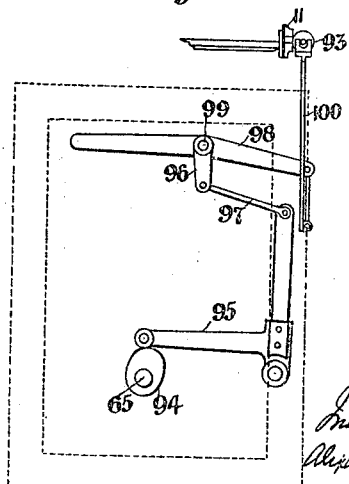
Figure 31:
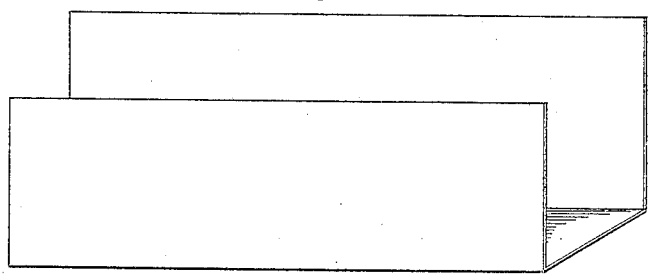
Figure 32:
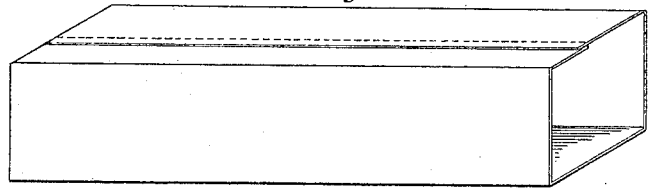
Figure 33:
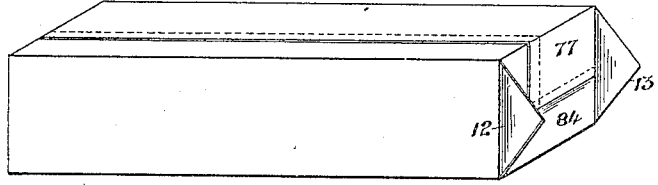
Figure 34:
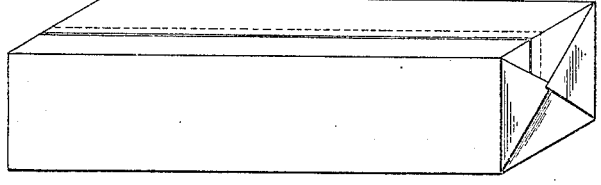
Figure 35:
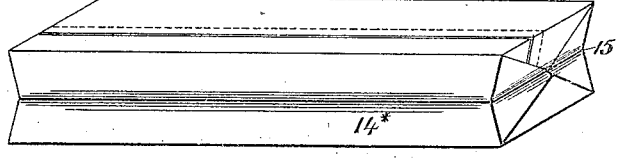

Figure 1 is a side elevation of one side of the machine. Fig. 1ª is a sectional elevation at right angles to Fig. 1, looking toward the rear of the machine. Fig. 1ᵇ is a perspective view of the table of the machine showing the bag former, table, side creasers and end creaser. Fig. 1ᶜ is a detail of the pasting mechanism. Fig. 2 is a plan of the machine. Fig. 3 is an elevation of the opposite side to that shown in Fig. 1. Fig. 4 is an end view looking from the front of the machine. Fig. 5 is an end view looking from the rear of the machine. Fig. 6 is an enlarged side elevation of the block on which the bag is formed. Fig. 6ª is an enlarged elevation of the bag former and carrier therefor, the bag former being in collapsed condition. Fig. 6ᵇ is a detail of the former removed from its carrier, in distended condition. Fig. 6ᶜ is a top view of Fig. 6ᵇ. Fig. 7 is an enlarged end elevation of the side creasers and operating mechanism. Fig. 8 is a plan and edge view of the creasers shown in Fig. 7. Fig. 9 is an enlarged side elevation of a stop for the cut sheets of paper. Fig. 10 is an end view of a portion thereof. Fig. 11 is an enlarged side elevation of the end creaser and extractor. Fig. 12 is a plan thereof. Fig. 13 is an enlarged side elevation of the end gummer for the bag. Fig. 14 is a plan thereof. Fig. 15 is a view looking from left to right of Fig. 13. Fig. 16 is an enlarged plan view of the mechanism for actuating the bag block. Fig. 17 is a sectional end elevation of the bag block and table. Fig. 18 is a side elevation of the adjustable sides for the bag machine. Fig. 19 is a plan thereof. Fig. 20 is a side elevation of the cam levers and connections for operating the end creaser and extractor. Fig. 21 is a side elevation of the cam levers and connections for operating the side arm creasers. Fig. 22 is a side elevation of the cam levers and connections for operating the end paster. Fig. 23 is a side elevation of the cam levers and connections for operating the paste roller for the end paster. Fig. 24 is a side elevation of the cam levers and connections for operating the top and end creaser. Fig. 25 is a side elevation of the cam levers and connections for operating the bottom end creaser. Fig. 26 is a side elevation of the cam levers and connections for operating the paster for the edge of the bag. Fig. 27 is a side elevation of the cam levers and connections for operating the right hand end folder; the left hand end folder being a duplicate thereof. Fig. 28 is a front elevation of the mechanism for operating the right and left hand top folders. Figs. 29 and 30 are a plan and end view respectively of the paster for the edge of the bag paper. Fig. 31 shows a sheet which has undergone the first stage of the operation having its two sides turned up. Fig. 32 shows the second stage; namely folding down the top edges. Fig. 33 shows the third stage with one end of the bag closed with the side flaps still to be pasted. Fig. 34 shows the bag completed. Fig. 35 shows the bag partly creased at the end and sides for convenience in packing purposes. Figs. 36 to 38 are details hereinafter referred to.

The sheets from which the bags are to be formed are cut to the required size and placed in a pile on a table arranged at one side of the machine; the sheets being drawn off, one at a time, by means of the horizontal arm 1, Fig. 29, which has a reciprocating motion in the guide 2, Fig. 5. This arm constitutes the paster for the edge of the bag paper and as it is reciprocated it passes over the paste roller 3, Fig. 17 to the nearest edge of the bag paper. One sheet of bag paper is then drawn on to the table 4, Fig. 17, the paster receding therefrom to its normal position, Fig. 5. The bag block 5 is now caused to descend on to the paper and forces the paper and table 4 downward until the paper is converted into the shape shown in Fig. 31; the top of the bag block 5 being level with the top of the table 6. The bag paper is then caused to be folded over as shown in Fig. 32 by means of the top folders 7 and 8 (Fig. 28) which are caused to advance toward each other until the top edge of the bag paper is properly folded over. These folders 7 and 8 are so arranged that the gummed edge of the bag paper is folded lastly. Upon the completion of the operation of folders 7 and 8 the top creaser 9, Fig. 1, and bottom creaser 10, Fig. 25, descend and ascend respectively to fold in the ends of the bag as shown in Fig. 33; the end of the bag being pasted by means of the reciprocating end paster 11, Fig. 1, after which the ends 12 and 13, Fig. 33, are turned inward by means of the right and left hand end folders 14, Fig. 27, which are actuated simultaneously and advance toward each other and then recede. The bag is now complete and the collapsible block 5 is collapsed for the purpose of allowing the bag to be creased at the two sides 14 and end 15, Fig. 35, for the purpose of packing. This is effected by means of the right and left hand creasers 16 and 17, Fig. 8, and end creaser 18, Fig. 11, which leaves the bag in a flattened state, the block 5 being in a line with the reciprocating bag extractor 19 which extracts the bag from the block, conveys it to the rear of the machine and deposits it in a suitable receptacle.

Various sizes of bags may be made with the same machine, that is to say, the bag table 6 and connections are horizontally and vertically adjustable. The bag block 5 may also be adjusted according to the size of bag required.

To effect the actuation of the first movement of the machine that is, taking a sheet from off the pile, a rotary motion is imparted to the cam shaft 20 (Figs. 2 and 26), by means of the spur pinion 21 and spur wheel 22, driven by a belt on pulley 23. The rotation of the cam shaft 20 causes the cam 20* to actuate the lever 24 which is pivoted on the shaft 25; the forward end of the said lever 24 being connected to the rocking bracket 26 by means of the rod 27. Connected to the rocking bracket 26 is a lever 28 which is connected at its upper end by means of the rod 29 to the reciprocating paster 1. It will be observed that when the lever 24 is elevated by its cam a motion of partial rotation is imparted to the lever 28 and consequently a reciprocating motion to the paster 1.

When the reciprocating paster has withdrawn a sheet from the pile and placed it on the table 4, it is necessary to hold the ungummed edge of the paper so that the reciprocating paster 1 does not drag the sheet along with it. This is effected by means of the arm 30, which is mounted on the shaft 31 carried by the brackets 32 which are bolted or otherwise secured to the side creaser brackets 33, as shown in Fig. 1 and more particularly in Figs. 9 and 10. A motion of partial rotation is given to the arm 30 by means of the rods 34 and 35; the rod 35 being pivoted at 36 and actuated by the cam 37, Fig. 4. The timing of the reciprocating paster 1 and holder arm 30 is effected by the difference of the throw in the cam.

As shown in Fig. 1$^a$, one of the sheets is taken from the pile of sheets shown on the left hand side of this figure by means of the picking up device 1, consisting of a bracket 1$^a$ which carries material for licking up the gum at 1$^b$. The bracket 1$^a$ is carried by two arms 1$^c$ one at each side of the slide 2, shown in Fig. 2, these arms being pivoted to the frame 2 which carries the reciprocating pick-up. Connected to the bracket 1$^a$ is a rod 1$^d$ which is governed and held in normal position by means of the spring 1$^e$ which is attached to the bracket 1$^f$ secured to the sliding frame 2; the other end of the spring being connected to the lug at 1$^g$ of the pivoted bracket 1$^h$, the said bracket having a lower lug 1$^j$ to which the rod 1$^d$ is connected. The normal position of the paster bracket 1 is such that it is clear of the gumming roller and the table.

When the reciprocating picking up and pasting device is moved in the direction of the paper, the portion 1$^b$ of the bracket 1 is lowered together with the arms 1$^c$ by reason of a stop at 1$^k$ formed on the bracket 1$^h$ as shown in Fig. 1. The stop 1$^k$ sliding with the frame 2 engages with the fixed stop 1$^l$ on the machine frame and the arrangement is such that the rod 1$^d$ is given a forward motion, whereby the bracket 1 is depressed so as to come into contact with the pasting roller 3; that is to say, the bracket 1$^h$ is given a motion of partial rotation to effect the lowering of the bracket 1$^b$ for the purpose stated. It will be observed that this stop arrangement causes the paster 1$^b$ or picker-up to engage with the paste roller 3 both when receding from the paper table and when advancing to take up another sheet of paper. Similarly by depressing the bracket 1 the portion 1$^g$ comes in contact with a fixed stop forward of the back stop and causes the bracket to descend and pick up a sheet of paper. When released from contact with the stop the spring 1ᵉ restores the bracket to its normal position. The action of the picker-up is such that the paper is gummed, and lifted up, deposited on the table 4 and taken from the bracket 1 of the picker-up by the arm 30. The sheet is now in position on the table 4 and the collapsible block 5 is caused to descend by means of the cam 38 which actuates the lever 39, Fig. 5; the said lever having a rocking motion and being provided with a rod 40 which is connected to a second rocking lever 41 which rocks on the shaft 42. The free end of lever 41 is connected to the upright rod 43 which is connected to the double lever 44. The lever 44 is pivoted at 45 and is connected at its forward end to a rod 46 connected to the top of the block 5. The free end of the double lever 44 is provided with a counter balance 47 to compensate for the weight of the block 5.

The table 4 is supported on two rods 4ᵃ which are jointed to two pivoted levers 4ᵇ pivoted on the bracket 4ᶜ. These levers 4ᵇ are provided with counter weights 4ᵈ and the action of the block or former 5 is such that it depresses the table by its pressure and as the block moves upward the table follows it by reason of the presssure being relieved. When the block 5 descends to the level of the top of the table 4 the top and bottom of the bag are folded over by the folders 7 and 8 which are operated by bell crank levers 48 and 49, the bell cranks being actuated by the cam 50 through the medium of rod 51, lever 52 and link 53. A backward and forward motion is given to the rod 51 by means of the cam 50; the free end of the rod being connected to one end of lever 52 by means of the link 53. The other end of the lever 52 is secured to the shaft 54 on which the bell crank lever 49 is mounted. The shorter arms 49* of the bell crank lever 49 is connected to another lever 55 by means of the link 56, the lever 55 being pivoted at 57. The forward end 58 of the lever 55 is adapted to engage with the underside of the smaller arm of the bell crank lever 48 and the arrangement is such that the lever 55 governs the motion of the bell crank lever 48.

The folders 7 and 8 are inclined to be closed under the influence of the spiral springs 59 and 60. As the lever 52 is drawn to the right, the folder 8 is traversed to the left whereby the connecting rod 56 of the lever 55 causes the portion 58 of the lever 55 to descend and the folder 7 is closed by means of the bell crank lever 48 under the influence of the spiral spring 59, the rod 61 being for the purpose of adjusting the traverse by means of the lock nuts 62.

The top of the bag having been folded over the top of the bag block 5 by means of the folders 7 and 8, I effect the folding in of the end of the bag by means of the top creaser 9, (Figs. 1 and 24) and bottom creaser 10 (Fig. 25). The cam 64 for operating the top creaser 9 is mounted on the shaft 65 which is at right angles to the shaft 20, a motion of rotation being imparted to the shaft 65 by means of the bevel gear wheels 66 and 67. As a rotary motion is imparted to the cam 64 the lever 68 is given a rocking motion on the rocking shaft 69, the free end of the lever 68 being connected to the rocking lever 70 by means of the rod 71, another lever 72 being connected to the free end of the lever 70. The top of the lever 72 is connected to the rocking lever 73. Mounted on the same shaft as the rocking lever 73 is a lever 76 which is connected to the slide 74 of the top creaser 9 and the arrangement is such that when the cam operates the lever 68 the top creaser 9 descends and forms the top end 77 of the bag, Fig. 33.

The bottom end creaser 10 as shown more particularly in Fig. 25, is operated by the cam 78 mounted on the shaft 20, the cam engaging with the rocking lever 79 which is connected to the bell crank lever 80 by means of the rod 81. The bell crank lever 80 is pivoted at 82 and connected by the link 83 of the bottom creaser 10 so that when a motion of rotation is given to the bell crank lever 80 a reciprocating motion is imparted to the bottom end creaser 10 whereby the bottom end flap 84, Fig. 33, is formed. The ends 77 and 84 of the bag are now gummed or pasted so as to receive the flaps 12 and 13, the cam 85 mounted on the shaft 65 actuating the bell crank rocking lever 86, the free end 87 of the said lever being connected to another lever 88 by means of the rod 89. The top of the lever 88 is connected to the slide 90 of the end paster 11 by means of the rod 91. As the lever 88 moves backward and forward it advances the end paster 11 to the ends 77 and 84 of the bag whereby they are gummed or pasted. The face of the end paster 11 is supplied with paste by means of the roller 93 which rises and falls so as to clear the end paster 92.

Fig. 23 shows the arrangement for actuating the pasting roller 93. A cam 94 is mounted on the shaft 65 for actuating the bell crank lever 95 which is connected to the lever 96 by means of the rod 97, the lever 98 being mounted on the shaft of the lever 96. The free end of the lever 98 is connected to the slide 100 of the paste roller 93 so that as the cam is rotated the slide 100 is caused to rise and fall carrying with it the roller 93.

To prevent the end of the paster 92 from adhering to the ends 77 and 84 of the bag as it recedes therefrom, I provide the small rod 101 mounted within the end paster 11. As the end paster recedes from the end of the bag the rod 101 is projected under the influence of the spiral spring 102, (Figs. 13, 14 and 15.)

The flaps 12 and 13 of the bag are turned inward by means of the side folders 14, the cam 103 mounted on the shaft 20 actuating the rocking lever 104, Fig. 27, the free end of the lever 104 being connected to the lever 105 by means of link 106. Lever 105 is pivoted at 106* and oscillates the lever 107 which is connected to the side folder 14 by means of the rod 108. It will be seen that as the end folders 14 advance toward each other they fold in flaps 12 and 13 as shown in Fig. 34. The block or former 5 consists of two plates, arranged one above the other and which are connected to the two bracketed guides 118 and 120. The guides 118 and 120 are slidably mounted within the carrier frame 116 and are operated so as to advance toward each other to collapse the block 5 and recede to distend the block for forming the bag. The carrier frame 116 lowers and elevates the block 5 which is retained in its expanded condition, as shown in Fig. 6$^b$ by means of the support 5$^a$. This support when the bag former is collapsed, is drawn toward the rear of the bag that is to say, clear of the back thereof, as shown in Fig. 6$^a$, by means of the cam actuated rod 128. The carrier frame 116 operates in the frames 116$^a$, 116$^b$.

The forming of the bag is now complete and the block 5 ascends until it is in a line with the side creases 16 and 17 and end creaser 18 when it is collapsed. The collapsing of the bag is effected by means of the cam 109 which is mounted on the shaft 110; the shaft 110 receiving a rotary motion by means of the spur wheels 111 and 112. The cam 109 effects the rising and falling of the rod 113 which actuates the arm 114 pivoted on the spindle 115 of the block frame 116. Mounted on the spindle 115 is the double bell crank lever 117 which is connected to the guide 118 of the collapsible block 5 by means of the rod 119. This arrangement is duplicated on each side of the block frame 116. Another portion 119* of the bell crank lever is connected to the top guide 120 of the collapsible block 5 by means of the rod 121; the remaining depending portion 122 of the bell crank lever being connected to the bell crank lever 123 by means of the rod 124, the bell crank lever 123 being similarly connected to the guides 118 and 120 as described with reference to the bell crank lever 117, the object of the connections being to effect the forward end and rear end of the collapsing of the bag block simultaneously.

The lever 113 is provided with a stop 125 which engages with the arm 114 and depresses it as the bag block ascends, whereby the ends of the bell crank lever 117 are caused to ascend and descend respectively which brings the guides 118 and 120 closer to each other. As the block frame 116 and bag block 5 descend and the stop 125 is disengaged from the arm 114, the counter balance weight 126 effects the opening of the collapsible block 5.

To allow the bag block 5 being compressed, it is necessary to cause the support 127 to slide to the rear of the machine. This I effect by means of the lever 128, which is connected to the slide by means of the rod 129, the lever 128 being pivoted on the shaft 130 and being provided with the links 131, 132 which are connected to the rocking lever 133* pivoted on the shaft 134 so that as the rocking lever 133* is given an upward and downward motion the rod 128 is given a reciprocating motion through the medium of the links 131, 132 whereby the support 127 is drawn to the rear of the block 5 after which the said block is collapsed. The block 5 and carrier frame 116 are provided with a rod 135 for the purpose of forming a support for the ends 77 and 84 of the bag when they are folded downward and upward. This rod is adapted to be forced to the rear of the machine by means of the end creaser 18 against the influence of the spiral spring 136, the said spring always returning the rod 135 to its normal position, shown in Figs. 1 and 6. The bag block being now collapsed, the bag is creased along each side and at the end in a similar manner as shown in Fig. 35.

As shown in Figs. 7 and 8, the side arm creasers 16 and 17 are carried in a position in a line with the center of the block 5 when collapsed and they are advanced toward the center of the block by means of the lever 137 which is connected to a bell crank lever 138 carried on the shafts 139, 140, shown more particularly in Fig. 1, the said shafts being carried by the brackets 141 mounted on the top of the supporting plate 142. The lever 137 is connected to the upper end of the bell crank lever 138 and to the lower end of the lever 143, a connection being made from the lever 143 to the slide 144 at one side the lower end of the lever 138 being connected to the slide 144 on the other side, a spiral spring 173 being employed to assist in returning the creasers to their normal position.

Supported from the slides 144 by means of the suspension rods 145 are the creasers 16 and 17. The shaft 139 is rocked by means of the cam 146 mounted on the shaft 65, Fig. 4 through the medium of the rocking lever 147 connected to a rocking lever 148 by means of the link 149. The free end of the lever 148 is connected by the rod 150 to the lever 151 mounted in the shaft 139. By this arrangement the shaft 139 is partially rotated, the side creasers being advanced toward the center of the block 5 whereby the sides of the bag are creased. Simultaneously with the creasing of the sides the end of the bag is creased, the end creaser 18 being advanced toward the end of the bag block. The end creaser 18 is supported in guides on the plate 142 and is capable of having a sliding movement to and from the block 5.

As shown in Figs. 4 and 11, the slide 151 is carried on the plates 142 and a reciprocating motion is given to the end creaser by means of the cam 152, Fig. 20, mounted on the shaft 165, the cam imparting a motion to the rocking lever 153 which is connected to the lever 154 by means of the rod 155. Mounted on the shaft 156 are two arms 157, 158, which are connected to the side 151 by means of the rod 159 so that when motion is imparted to the lever 153 the end creaser 18 is caused to reciprocate and crease the end of the bag.

Simultaneously with the creasing of the end of the bag, it is withdrawn from the block 5 by means of the extractor clips 160, 161, which are carried by the end creaser 18. The extractor clips 160, 161 are pivoted at 162 and their operation is governed by rods 163, 164, pivoted at 165 to the slide 166, Fig. 12. The slide is adapted to traverse backward and forward and is held in its normal position, as shown in Figs. 11 and 12, by means of the spiral springs 167, 168. The frame 169 of the end creaser is provided with an abutment 170 adapted to engage the notched arm 171. When the abutment 170 is out of engagement with the notch in the arm 171 the springs 167, 168 carry forward the slide 166 and cause the rods 163, 164 to close the clips 160 and 161 on the top of the V-shaped end creaser; the bag intervening between the point of the clips and the V-shaped end creaser. A backward motion is then given to the extractor which carries the bag toward the back of the machine until the abutment 170 is engaged by the stop 172, Fig. 1 by which it is forced back to the position shown in Fig. 11 which has the effect of distending the springs 167, 168.

When making bags of various sizes it is necessary to alter the size of the bag block 5; also to alter the level of the table 6. This I effect by carrying the table in the frame 174 which is capable of being moved up and down in the frame 175 by means of the worm 176 which is mounted on the stationary frame 175. The worm 176 meshes with a worm wheel 177 which is mounted on the spindle 178 running across the machine. On each end of the spindle 178 is mounted a cam 179 as shown in Fig. 3. The cams 179 engage the radial portion 180 of the bracket 6 so that when the worm wheel 177 is partially rotated, the cam elevates the table 6. By this action a bag may be produced of less depth than the regular form; by lowering the table a bag of greater depth is produced. If a bag of less depth is required, a bag block of less depth is applied to the machine, and the bars 181, 182, Figs. 18 and 19 are adjusted equally at both sides of the center of the bag block by means of the right and left hand screw rod 183; the bar 182 being carried on the frame work 184 of the lower frame 185.

Figs. 1 and 4 show a hand wheel 186 for effecting the movement of the parts assembled within the frame work 175 of the machine. A friction clutch 187 may be employed on the main driving shaft 20 of the machine (shown in Figs. 2 and 5) so that the machine may be stopped or set in motion as desired by the operator by means of the clutch lever 188 mounted at the front of the machine.

For the purpose of maintaining the pile of sheets of bag paper at a given level, I may employ an automatic rising table 189 which is elevated by means of the revolving eccentric 190 and actuating depending eccentric lever 191. Secured on the shaft 192 of the eccentric 190 is a hand wheel 193 which is given a motion of gradual rotation by means of the friction pawl 194 actuated by the rod 195 pivoted on the rocking shaft 134, the rod 195 receiving its motion through the medium of the cam 196 and lever 197. As the hand wheel 193 is rotated the eccentric 190 elevates the rod 191 whereby the table 189 is elevated. The pivoted lever 198 and guide rod 199 are for the purpose of insuring a parallel motion of the table 189.

In lieu of using two end folders such as 14 Fig. 27, I may employ a hinged flap folder 200 Fig. 37, the said folder being actuated by a lever 201 which is pivoted to the folder at 202 and connected to the rod 107 in a similar manner to that described with reference to Fig. 27.

Counter balances or spiral springs may be employed on any of the various motions for the purpose of returning the said motions to their normal positions.

Having thus described my invention, the following is what I claim as new therein and desire to secure by Letters Patent:

1. In a machine for making block paper bags, the combination of a frame, vertical guides supported on said frame, a vertically sliding collapsible former mounted in said guides, a table having an opening and platform for said former, means for gumming and conveying a sheet of bag paper to said table, means for folding said paper over the former to form a square tube, means for folding the ends, elevating and collapsing said former, and means for extracting the bag from the former, as set forth.

2. In a machine for making block paper bags, the combination of a frame, vertical slides supported on said frame, a vertical sliding collapsible former adapted to slide in said guides, a table having an opening, a platform for said former, means for gumming and conveying a sheet of bag paper to said table, means for folding said paper over the former to form a square tube, means for folding the ends, collapsing said former, means for extracting the bag from the former, an adjustable pile support, and means for automatically maintaining said pile support at the proper level, as set forth.

ALEXANDER HENDERSON.

Witnesses:
   JNO. J. GREIG,
   JOHN H. NEILL.